United States Patent [19]

Flaim et al.

[11] Patent Number: 4,475,634

[45] Date of Patent: Oct. 9, 1984

[54] DISC BRAKE ROTOR DAMPING

[75] Inventors: Thomas A. Flaim, Troy; Glen Stephens, Ortonville; Edwin J. Miller, Romeo, all of Mich.

[73] Assignee: General Motors Corporation, Detroit, Mich.

[21] Appl. No.: 469,647

[22] Filed: Feb. 25, 1983

[51] Int. Cl.³ ............................................. F16D 65/12
[52] U.S. Cl. .............................. 188/218 A; 188/73.35; 301/6 WB
[58] Field of Search ............... 188/18 A, 73.35, 73.36, 188/73.37, 218 A, 379, 381; 301/6 WB, 9 CN

[56] References Cited

U.S. PATENT DOCUMENTS 1,818,447  8/1931  Baker .......................... 188/218 A X
1,833,413  11/1931  Chase ............................. 188/218 A Primary Examiner—Duane A. Reger
Attorney, Agent, or Firm—D. D. McGraw

[57] ABSTRACT

A brake disc has a hat section tapered frusto-conically and receives a viscoelastic damping material between the tapered hat section and the mating outer periphery of the disc mounting flange. The damping material may be rubber coated steel shim stock.

2 Claims, 1 Drawing Figure

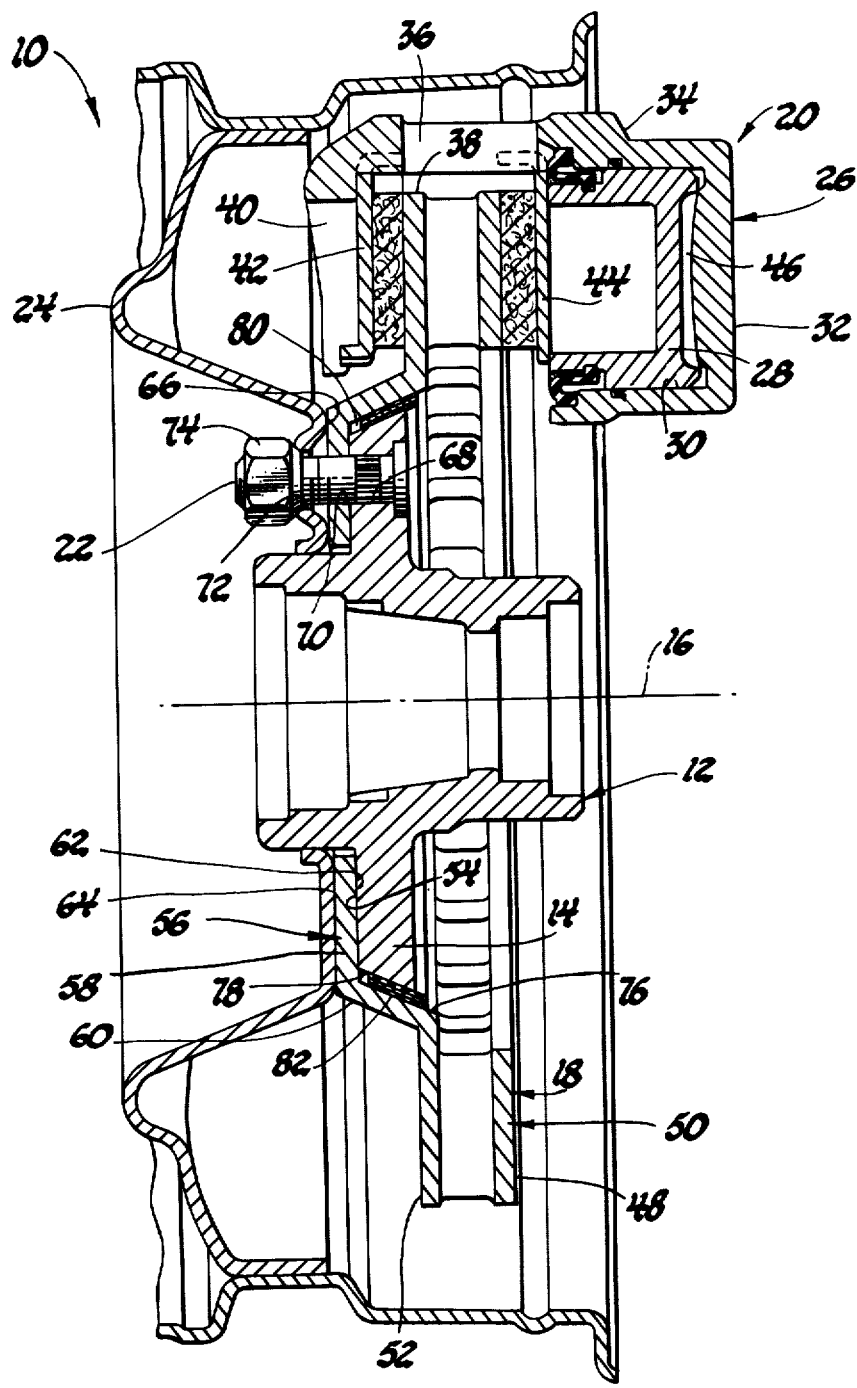

DISC BRAKE ROTOR DAMPING

The invention relates to an arrangement for damping noise generating vibrations in a disc brake rotor during brake application, and more particularly to an arrangement wherein damping material is provided between a tapered rotor hat section and a similar tapered bearing flange. The tapered or conical surfaces of the rotor and bearing flange mate with a small axially extending space between the tapered surfaces and a layer of damping material is provided in the space. The precise spacing of the tapered surfaces is controlled by having mounting faces on the rotor hat section and one side of the bearing flange which are in direct and secure axial engagement when assembled. The damping material is slightly greater in axially extending thickness than the space between the tapered surfaces so that, when the rotor is secured to the bearing flange and the mounting faces are in tight engagement, the damping material is squeezed. It is preferable to use a viscoelastic damping material. An example of such material may be rubber coated steel shim stock. Other damping materials may also be used.

IN THE DRAWING

The FIGURE is a cross-section view of a vehicle wheel assembly including a bearing hub with flange, a brake rotor, a wheel and a brake caliper assembly. Certain parts are broken away.

The vehicle wheel and brake assembly 10 includes a bearing hub 12 having a flange 14 extending therefrom axially perpendicular to the hub axis 16. Axis 16 may be the axis of a stub axle provided as a part of a steering knuckle, not shown, but well known in the art. A brake rotor 18 forms a part of the disc brake assembly 20 and is secured to the bearing hub 12 by means of several mounting studs 22 and stud nuts 74. The vehicle wheel 24 is also secured to the bearing hub by studs 22 and nuts 74. A suitable tire, not shown, is mounted on the wheel as is well known in the art.

The disc brake assembly 20 also includes a caliper assembly 26, with portions thereof being illustrated in the drawing. The particular caliper assembly shown is of the sliding caliper type wherein an actuating piston 28 is reciprocably received in a cylinder 30 formed in the inboard leg 32 of the caliper housing 34. A housing bridge section 36 extends across the outer periphery 38 of rotor 18 and connects the inboard leg 32 with an outboard caliper leg 40. An outboard brake shoe assembly 42 is suitably mounted on the caliper housing 34 so as to be engaged by outboard leg 40 for brake actuation. An inboard brake shoe assembly 44 is similarly mounted adjacent the inboard leg 32 and is engaged by piston 28 so that brake actuating pressure introduced into chamber 46 of cylinder 30 will move the piston and the inboard brake shoe assembly into brake actuating engagement with the braking surface 48 on one side of the rotor braking section 50. The caliper housing 34 will be moved by the brake actuating pressure so that outboard leg 40 will move the outboard brake shoe assembly 42 into brake actuating engagement with the braking surface 52 on the axially opposite side of rotor braking section 50 from the braking surface 48. It is to be understood that other types of caliper assemblies may be used in conjunction with the rotor damping arrangement herein disclosed and claimed.

The bearing hub 14 has a flange side defining a mounting face 54. The rotor 18 has a hat-shaped section 56 defined by a crown portion 58 and an intermediate portion 60 joining crown portion 58 and rotor braking section 50. Crown portion 58 has oppositely disposed mounting faces 62 and 64 formed thereon. Mounting face 62 is in mating relation with the mounting face 54 of bearing hub flange 14. Mounting face 64 is axially opposite mounting face 62 and is in mating relation with the wheel mounting face 66 provided at the inner periphery of wheel 24. Mounting studs 22 are received in axially extending openings 68 formed through flange 14 in circumferentially spaced relation. Studs 22 also extend through openings 70 formed in the crown portion 58 and openings 72 formed in the inner peripheral portion of wheel 24 defining wheel mounting face 66. The stud nuts 74 are threaded on the studs 22 and engage the wheel inner periphery in a manner well known in the art. When the nuts are tightened, they force the wheel inner periphery mounting face 66 into secure engagement with the rotor crown portion mounting face 64. This also forces the rotor crown portion mounting face 62 into secure engagement with the mounting face 54 of flange 14.

The intermediate portion 60 of the rotor hat-shaped section 56 is tapered to define a frusto-conical portion having a frusto-conical tapered inner surface 76. The diameter of the frusto-conical inner surface 76 is greater at the point where intermediate portion 60 joins rotor braking surface 52 than it is at the point where intermediate portion 60 joins crown portion 58. The circumferential outer surface of flange 14 is also tapered to define a frusto-conical outer surface 78 which is positioned in mating relation with inner surface 76, but axially spaced therefrom. Thus a space 80, which is tapered in the same frusto-conical manner as surfaces 76 and 78, is defined between these surfaces, and has an axially extending component. The precise spacing is defined when mounting face 62 is in secure face engagement with mounting face 54.

Damping means 82 formed of suitable damping material is received in space 80 so that it extends circumferentially about flange 14 and circumferentially within intermediate portion 60. The damping material 82 is preferably of such a thickness in free form so as to be squeezed between surfaces 76 and 78 when nuts 74 are tightened on studs 22 until mounting face 62 securely engages flange side 54. While it is contemplated that various damping materials may be used, it has been found that rubber coated steel shim stock, currently used as damping material attached to the back of disc brake shoes, will provide excellent damping.

The braking section 50 of the rotor 18 tends to vibrate in directions extending parallel to the axis of rotation 16. By providing the damping material 82 in the intermediate portion 60 of the rotor hat-shaped section 56 and engaging it with the bearing hub flange 14, the damping material is rigidly backed and effectively decreases noise generated by the vibrations of the brake section 50 occurring during brake actuation. It is important to position the damping material 82 so that it does not lessen the security between the mounting flange 14 and the rotor 18 and the wheel 24. The torque exerted on the nuts 74 to place the mounting studs 22 in tension so as to secure the wheel and rotor to the bearing hub is not adversely affected since direct mounting face engagement of these elements is provided, and the securing force is not required to pass through the damping material.

The embodiments of the invention in which an exclusive property or privilege is claimed are defined as follows:

1. In a disc brake assembly having a brake rotor rotatable about an axis and including a braking section formed as an annulus with axially opposite braking surfaces, said braking section being subject during brake actuation to noise-generating vibrations, and a bearing hub and flange also rotatable about said axis and adapted for mounting said brake rotor and a wheel to be braked; the improvement comprising:

a hat-shaped section including a crown portion on said brake rotor providing a mounting face for secure mounting face engagement with one side of said bearing flange and an intermediate portion joining said crown portion and said braking section;

said hat-shaped section having a frusto-conical inner surface formed on said intermediate portion, and said bearing flange having a frusto-conical outer surface formed thereon complementary to said inner surface;

said bearing flange outer surface being so sized relative to said hat-shaped section frusto-conical inner surface that when said bearing flange and said hat-shaped section are in secure mounting engagement at said mounting face a predetermined conically extending space is defined between the inner surface of said hat-shaped section and the outer surface of said bearing flange on the axially opposite side of said brake rotor from said wheel;

and damping means received in said conically extending space between said inner and outer surfaces and engaged by said inner and outer surfaces in axially pressed relation when said bearing flange and said hat-shaped section are in secure mounting engagement at said mounting face, said damping means damping the aforementioned vibrations set up in said braking section during braking by the disc brake assembly.

2. In a disc brake assembly having a disc rotatable about an axis and including a braking section formed as an annulus with axially opposite braking surfaces, said braking section being subject during brake actuation to noise-generating vibrations in disc axial directions, and a bearing hub also rotatable about said axis and having a disc and wheel mounting flange formed thereon; said disc further having a hat-shaped section including a crown portion providing a mounting face in secure mounting face engagement with one side of said mounting flange and an intermediate portion having a component of axially displaced extension and joining said crown portion and said braking section; the improvement comprising:

said disc hat-shaped section having a frusto-conical inner surface formed on said intermediate portion, and said bearing hub having a frusto-conical outer surface formed thereon;

said bearing hub outer surface being so sized relative to said hat-shaped section inner surface that when said flange and said mounting face are in secure mounting face engagement a predetermined axially extending space is defined between same inner and outer surfaces;

and damping means received in said axially extending space between said inner and outer surfaces and engaged by said inner and outer surfaces in axially pressed relation when said flange and said mounting face are in secure mounting face engagement, said damping means damping the aforementioned vibrations set up in said disc braking section during braking and being positioned on the axially opposite side of said disc hat-shaped section crown portion from the mounting position of a wheel to be braked by the disc brake assembly.

* * * * *